W. D. YOCUM.
NUT LOCK.
APPLICATION FILED MAY 5, 1921.
1,407,779.
Patented Feb. 28, 1922.
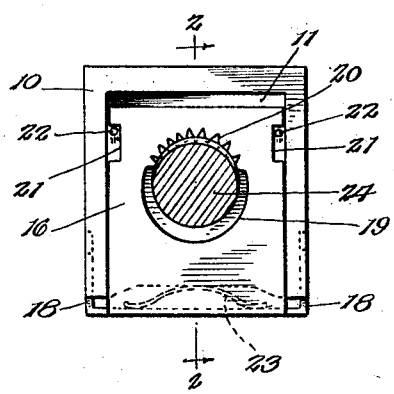
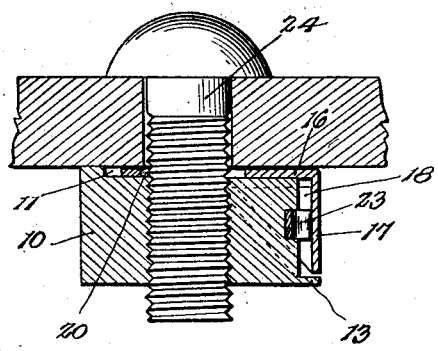
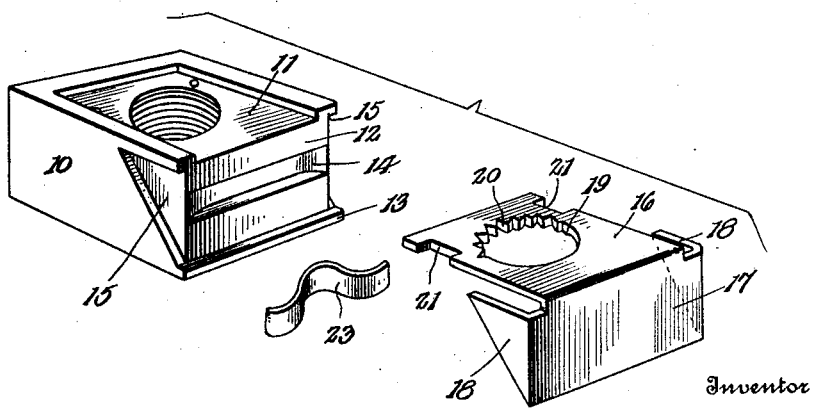
Inventor
W. D. Yocum.
By Lacey & Lacey, Attorneys

UNITED STATES PATENT OFFICE.

WILLIAM D. YOCUM, OF WETUMKA, OKLAHOMA.

NUT LOCK.

1,407,779.  Specification of Letters Patent.  Patented Feb. 28, 1922.

Application filed May 5, 1921. Serial No. 466,918.

*To all whom it may concern:*

Be it known that I, WILLIAM D. YOCUM, a citizen of the United States, residing at Wetumka, in the county of Hughes and State of Oklahoma, have invented certain new and useful Improvements in Nut Locks, of which the following is a specification.

This invention relates to an improved nut lock and has as one of its principal objects to provide a nut embodying means whereby when the nut has been threaded into position upon a bolt said nut will be automatically secured against accidental displacement from the bolt.

The invention has as a further object to provide a locking member upon the nut normally projected to active position but which, during application or removal of the nut may be coincidentally rendered inactive so that said nut may be applied or removed without interference by the locking member.

And the invention has as a still further object to provide the locking member with a depressible head engageable by the wrench employed in applying or removing the nut for rendering the locking member inactive.

Other and incidental objects will appear hereinafter.

In the drawing:

Figure 1 is a plan view of my improved nut lock illustrating the locking member thereof in active position engaging a bolt, said bolt being shown in section.

Figure 2 is a vertical sectional view on the line 2—2 of Figure 1, looking in the direction of the arrows, and Figure 3 is an inverted perspective view illustrating the parts of the device disassembled.

In carrying the invention into effect, I employ a preferably rectangular nut 10 having its bottom face formed, as clearly shown in Figure 3, with a rectangular recess 11 opening through the adjacent margin of one side face 12 of the nut. Projecting from the opposite margin of the side face 12 is an overhanging protecting flange 13 and extending from side to side of said face, substantially medially thereof, is a substantially arcuate recess or groove 14. Leading from the ends of the face 12 along the adjacent sides of the nut are substantially V-shaped recesses 15.

Mounted upon the nut is a locking member therefor having a shank 16 slidable longitudinally in the recess 11 and provided with an angularly disposed integral head 17 confronting the face 12 of the nut in substantially parallel relation. The head 17 is elongated to extend beyond the side faces of the shank substantially flush with the side faces of the nut having the recesses 15 therein, and projecting inwardly from the extended portions of said head at right angles thereto is a pair of substantially V-shaped retaining lugs 18 disposed in said recesses and shiftable therein as the locking member is moved. Near its inner end edge, the locking member is formed with a bolt receiving opening 19 adapted to register with the usual bolt opening in the nut and provided at the side thereof nearest said edge with an arcuate series of gripping teeth 20. Formed in the side edges of the locking member near their inner ends, are oppositely disposed notches 21 and driven into the bottom wall of the recess 11 to extend through said notches are stop pins 22 engageable with the rear walls of the notches for limiting the locking member in its outward shifting movement upon the nut, said stop pins, in conjunction with the lugs 18, acting to secure the locking member upon the nut. Disposed in the recess 14 behind the head 17 of the locking member is a bowed leaf spring 23 bearing at its ends, in the manner clearly illustrated in Figures 1 and 2, against said head for normally projecting the locking member outwardly to active position with the gripping teeth 20 projected to overhang the bolt opening in the nut. In Figures 1 and 2 of the drawing, the nut is shown in conjunction with a bolt 24 so that when the locking member is thus resiliently actuated by the spring teeth will be caused to engage the bolt and lock the nut against accidental rotation. It will be noted that the retaining lugs 18 act to prevent endwise displacement of the spring 23 from the recess 14 while the flange 13 as well as said lugs tend to prevent the entrance of dirt or other foreign matter between the head 17 and face 12 of the nut.

In the normal position of the locking member, the head 17 projects at its outer face somewhat beyond the flange 13 of the nut so that in applying the nut to a bolt a wrench may be engaged with said head for forcing the locking member inwardly against the tension of the spring 23 to inactive position with the teeth 20 thereof lying at one side of the bolt opening in the nut. Thus, the nut may be threaded upon the bolt without interference by the locking member. However, immediately upon release of the head, the spring 23 will act to automatically project the locking member to active position causing the teeth 20 to grip the bolt so that the nut will be firmly secured upon the bolt. To remove the nut, it is simply necessary to shift the locking member to inactive position as will be readily understood. Preferably, the nut is disposed upon the bolt in the manner illustrated in Figure 2, so that the nut will overlie the locking member for excluding the weather therefrom and in order that said member may not bind between the nut and the work, the shank of the locking member is preferably slightly countersunk in the nut.

Having thus described the invention, what is claimed as new is:

1. A nut lock including a nut, a shiftable locking member thereon provided with means to coact with a bolt and having an angularly disposed head confronting one side face of the nut, the head being formed with laterally directed retaining lugs coacting with other of the side faces of the nut for securing the locking member upon said nut, and a bowed leaf spring disposed between the first mentioned side face of the nut and the head for projecting the locking member to active position.

2. A nut lock including a nut having one side face thereof formed with a projecting flange, a shiftable locking member upon the nut provided with means to coact with a bolt and having an angularly disposed head confronting said side face in spaced relation thereto, and actuating means interposed between the side face and the head for projecting the locking member to active position, the flange in said active position of the locking member overhanging the head to provide a water shed for the locking member.

3. In a nut lock, the combination with a nut having recesses therein, of a locking member having a shank shiftable in one of said recesses and having an angularly disposed head confronting one side face of the nut, the head being formed with laterally directed retaining lugs received in other of said recesses and coacting with the walls thereof for retaining the member upon the nut, said side face of the nut having a recess therein, and a bowed leaf spring mounted in said recess to lie between said side face and the head of the locking member for projecting the locking member to active position.

4. A nut lock including a nut, a locking member thereon having a head confronting one side face of the nut and provided with lugs coacting with adjacent side faces of the nut slidably connecting the locking member with the nut, and yieldable means interposed between said head and the nut urging the locking member to active position.

5. A nut lock including a nut, a locking member having a bolt engaging shank shiftable across one face of the nut and being formed with an angularly disposed head confronting one side face of the nut, actuating means interposed between said side face of the nut and the head for shifting the shank to active position, there being notches in the side edges of the shank, and stop pins engageable with the end walls of the notches for limiting the locking member against displacement.

In testimony whereof I affix my signature.

WILLIAM D. YOCUM. [L. S.]